US005818724A

United States Patent [19]
Brewster, Jr. et al.

[11] Patent Number: 5,818,724

[45] Date of Patent: Oct. 6, 1998

[54] METHOD OF IN-LINE ADDRESSING FOR MODULAR FOLDER INSERTERS

[75] Inventors: William H. Brewster, Jr., Fairfield; Joseph D. Collins, Seymour, both of Conn.

[73] Assignee: Pitney Bowes Inc., Stamford, Conn.

[21] Appl. No.: 618,885

[22] Filed: Mar. 20, 1996

[51] Int. Cl.[6] .......................... G06F 17/00; B65H 45/00

[52] U.S. Cl. .............................. 364/478.08; 364/478.14; 364/478.15; 705/408; 270/52.09

[58] Field of Search ......................... 364/478.08, 464.02, 364/464.12, 464.17, 464.22, 478.14, 146, 478.15; 53/411, 415, 416; 395/114, 117; 705/403, 406–410; 27/52.03, 52.09

[56] References Cited

U.S. PATENT DOCUMENTS

| | | | |
|---|---|---|---|
| 3,983,679 | 10/1976 | Zemke | 53/21 |
| 4,527,791 | 7/1985 | Piotroski | 364/146 |
| 4,639,872 | 1/1987 | Baggarly et al. | 364/464 |
| 4,797,832 | 1/1989 | Axelrod et al. | 364/478.15 |
| 4,800,504 | 1/1989 | Durst, Jr. et al. | 364/478 |
| 4,800,506 | 1/1989 | Axelrod et al. | 364/478 |
| 4,992,950 | 2/1991 | Francisco | 364/478 |
| 5,054,757 | 10/1991 | Martin et al. | 270/45 |
| 5,080,509 | 1/1992 | Stone | 400/23 |
| 5,099,633 | 3/1992 | Gombault et al. | 53/411 |
| 5,200,903 | 4/1993 | Gilham | 364/464.02 |
| 5,257,196 | 10/1993 | Sansone | 364/464.02 |
| 5,278,947 | 1/1994 | Balga, Jr. et al. | 395/117 |
| 5,319,562 | 6/1994 | Whitehouse | 364/464.03 |
| 5,343,556 | 8/1994 | Silverberg | 395/117 |
| 5,555,703 | 9/1996 | Gombault et al. | 53/411 |
| 5,583,970 | 12/1996 | Strobel | 395/114 |
| 5,612,889 | 3/1997 | Pintsov et al. | 364/478.14 |

FOREIGN PATENT DOCUMENTS

| | | | |
|---|---|---|---|
| 0 265 192 | 10/1987 | European Pat. Off. | B07C 1/00 |

*Primary Examiner*—James P. Trammell
*Assistant Examiner*—Bryan Bui
*Attorney, Agent, or Firm*—Melvin J. Scolnick; Charles R. Malandra

[57] ABSTRACT

The invention is a method of in-line addressing, for both matched and non-matched mail, comprising a number of steps which begin with the generation of document data in a data processing system and then transmitting that document data to a document printer. The document data is printed, at the document printer, onto a substrate which is subsequently fed to an accumulator. Additionally, address data is generated in the data processing system and transmitted to an envelope printer where the address data is printed to one or more envelopes. The envelope printer is capable of printing a return address, a destination address, and a bar code in respect of the destination address upon the envelope. The address data can be merged with graphics data so that the envelope printer is further capable of printing graphics on the envelope. Once at the accumulator, predetermined batches of one or more sheets of the printed substrate are fed into a sheet folder. The sheet folder folds the predetermined batches and then subsequently feeds the folded batches to the insert feeder. The folded batches are inserted into the printed envelopes to form a mail piece which is then transported to a mail processing apparatus; in an alternative embodiment, the envelopes can be printed upon after stuffing. Taken together, the sheet feeder, accumulator, sheet folder, and insert feeder comprise a folder/inserter system. The envelope throughput is timed to match batch throughput of the folder/inserter system.

14 Claims, 8 Drawing Sheets

METHOD OF IN-LINE ADDRESSING FOR MODULAR FOLDER INSERTERS

BACKGROUND OF THE INVENTION

This invention relates to the field of in-line processing of a mailpiece. More particularly, it relates to the use of a plurality of printers in both a matched mail and a non-matched mail environment. A matched mail environment is one in which the address printed on the document matches the address to be printed on the document's corresponding envelope. In the matched mail environment, it is desirable that two separate data streams, each with its own distinct path, emanate from the same data source and eventually re-unite at some combined operation (usually the insertion step). A non-matched mail environment, on the other hand, is one in which the document does not have a unique address which corresponds to the address to be printed upon the document's corresponding envelope. In the non-matched mail environment, two separate data streams, each with its own distinct path, emanate from two different data sources and eventually unite at some combined operation.

In general, in-line processing takes component parts of unique functionality and places the parts in a line for the purpose of getting the most out of each functional area placed in-line. In-line addressing is a method of producing a finished mailpiece by the use of a series of modules, each module with its own unique function. By utilizing two or more printers, working essentially simultaneously, the in-line functionality of the overall system is enhanced by making the best use of the throughput of the printers rather than alternating the print responsibilities of a single printer within the system. Additionally, the in-line functionality for matched mail is further increased because there is an increased likelihood of matching a printed document to its corresponding printed envelope.

How the various modules of an in-line system inter-relate, so that each can communicate with the other so as to properly time the insertion of printed documents into that document's corresponding printed envelope is disclosed in such patents as U.S. Pat. No. 4,992,950 for a MULTIPLE PROCESSING STATION MESSAGE COMMUNICATION, issued Feb. 12, 1991 to Francisco.

Interactive functionality between mailer and addressee of modular systems has been addressed by such patents as U.S. Pat. No. 4,800,504 for an INTERACTIVE OUTGOING AND INCOMING MAILPIECE PROCESSING SYSTEM, issued Jan. 24, 1989 to Durst, Jr. et al.

But, a disadvantage of the prior art has been the concentration of functionality on a single data stream within the in-line flow. By splitting a data stream intentionally as in the case of matched mail or, by necessity as in the case of non-matched mail, a plurality of printers can be used to print a corresponding data stream. Thus, a distinct advantage is gained in the production of a mailpiece by the creation of a plurality of data streams wherein each data stream is directed to a specialized printer capable of printing that data in the best mode possible.

Therefore, an object of the present invention is to improve the throughput of in-line addressing systems by providing a means of producing a plurality of data streams, each of which can utilize a separate print means, and then combine the data streams within the capability of the in-line modules. Another object of the present invention is to provide the ability to use specialized addressing printers that can print, among other data, Postnet barcodes and/or graphics to an envelope within an in-line addressing system without degrading the functionality of the system's ability to print document data to cut sheets.

SUMMARY OF THE INVENTION

According to the invention, the object is achieved and the disadvantages of the prior art are overcome by a method of in-line addressing for matched and non-matched mail comprising a sequence of steps.

The method steps begin with the generation of document data in a data processing system and then transmitting that document data to a document printer. The document data is printed, at the document printer, onto a substrate which is subsequently fed via a sheet feeder to an accumulator.

Once at the accumulator, predetermined batches of one or more sheets of the printed substrate are fed into a sheet folder. The sheet folder folds the predetermined batches and then subsequently feeds the folded batches to the inserter. The folded batches are inserted into the printed envelopes to form a stuffed envelope which is then transported to a mail processing apparatus.

Additionally, address data is generated in the data processing system and transmitted to an envelope printer where the address data is printed to one or more envelopes. The envelope printer is capable of printing a return address, a destination address, and a bar code in respect of the destination address upon the envelope. The address data can be merged with graphics data so that the envelope printer is further capable of printing graphics on the envelope. The graphics could be a part of the address data or could be downloaded into RAM memory prior to receipt of the address data. The printed envelopes are fed to an inserter where one or more sheets of printed substrate are inserted therein. In an alternative embodiment of the invention, the envelopes are printed subsequent to having the printed document inserted therein.

Taken together, the sheet feeder, accumulator, sheet folder, and insert feeder comprise a folder/inserter system of variable throughput potential. The envelope throughput of the envelope printer is timed to match batch throughput of the predetermined batch in the folder/inserter system.

The folder/inserter system monitors passage of the substrate as the substrate is fed through the folder/inserter system; and, if said substrate is determined to be jammed or out of alignment thus causing a feed path error, then the folder/inserter system transmits a first signal to a system operator wherein the first signal is indicative of the feed path error; and, the folder/inserter system transmits a second signal to the data processing system wherein the second signal is indicative of the feed path error and wherein the second signal is an instruction to the data processing system to stop transmitting document data to the document printer and to stop transmitting address data to the envelope printer.

DETAILED DESCRIPTION OF THE PREFERRED EMBODIMENTS

Figure 1A:
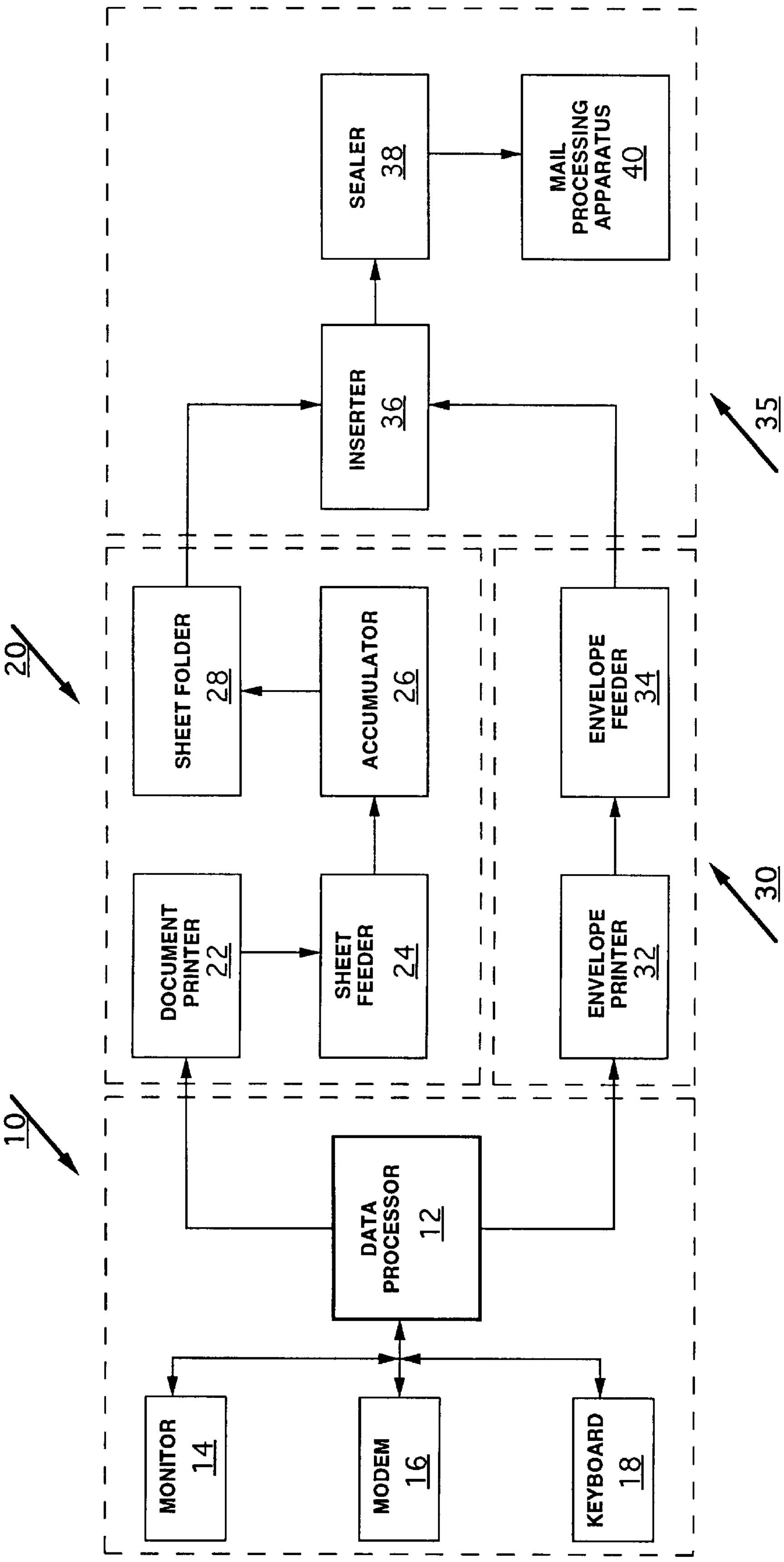
FIG. 1A is a block diagram of the apparatus that can be used in a matched mail embodiment of the present invention where the envelope printer is in parallel to the document printer.

Turning to FIG. 1A, there are shown in block form, four subsystems (10, 20, 30 and 35) that together form a system that can be used in a matched mail embodiment of the present invention. A matched mail environment is one in which the address to be printed upon the document matches the address to be printed upon the document's corresponding envelope. In the matched mail environment it is desirable that two separate data streams, each with its own distinct path, emanate from the same data source and eventually re-unite at some combined operation.

Subsystem 10 comprises the elements which initiate and control the two data streams. Subsystem 10 is comprised of data processor 12 which stores the programs and applications that initiate addressing data for a first data stream and document data for a second data stream. Data processor 12 is operatively connected to: monitor 14 for viewing of the application's operator interface; modem 16 for accepting data from environments external to the system; and, keyboard 18 for local entry of data to be used by data processor 12.

Subsystem 20 comprises the elements which support the document data stream. Subsystem 20 is comprised of: document printer 22 which prints document data, obtained from data processor 12, to a substrate such as a standard cut sheet; sheet feeder 24 which directs the printed substrate or sheet to an accumulator; accumulator 26 which collects the individual sheets to be folded together by a sheet folder; and, sheet folder 28 which folds together the individual sheets to be inserted in each envelope.

Subsystem 30 comprises the elements which support the addressing data stream. Subsystem 30 is comprised of envelope printer 32 which prints addressing data (the addressing data may include Postnet barcoding and graphics data) obtained from data processor 12, to a substrate such as an envelope; and, envelope feeder 34 which directs the printed envelope to an inserter.

Subsystem 35, which comprises mailpiece processing apparatus, reunites the divided data streams by inserting the folded and addressed sheets into their corresponding addressed envelopes. The elements of subsystem 35 include inserter 36 which places the folded sheets coming from sheet folder 28 into the envelopes coming from envelope feeder 34. The stuffed envelopes are then passed from inserter 36 to sealer 38 where the envelopes are sealed before being finished by mail processing apparatus 40. The mail processing apparatus can be diverse in that the apparatus might include: another inserter (if the sealed envelope was being further inserted into another envelope); a mailing scale; a postage meter; and, tabbing devices among other possible elements. A key element of the overall system is the timing of the two data streams so as to properly match the printed document with its respective printed envelope.

Figure 1B:
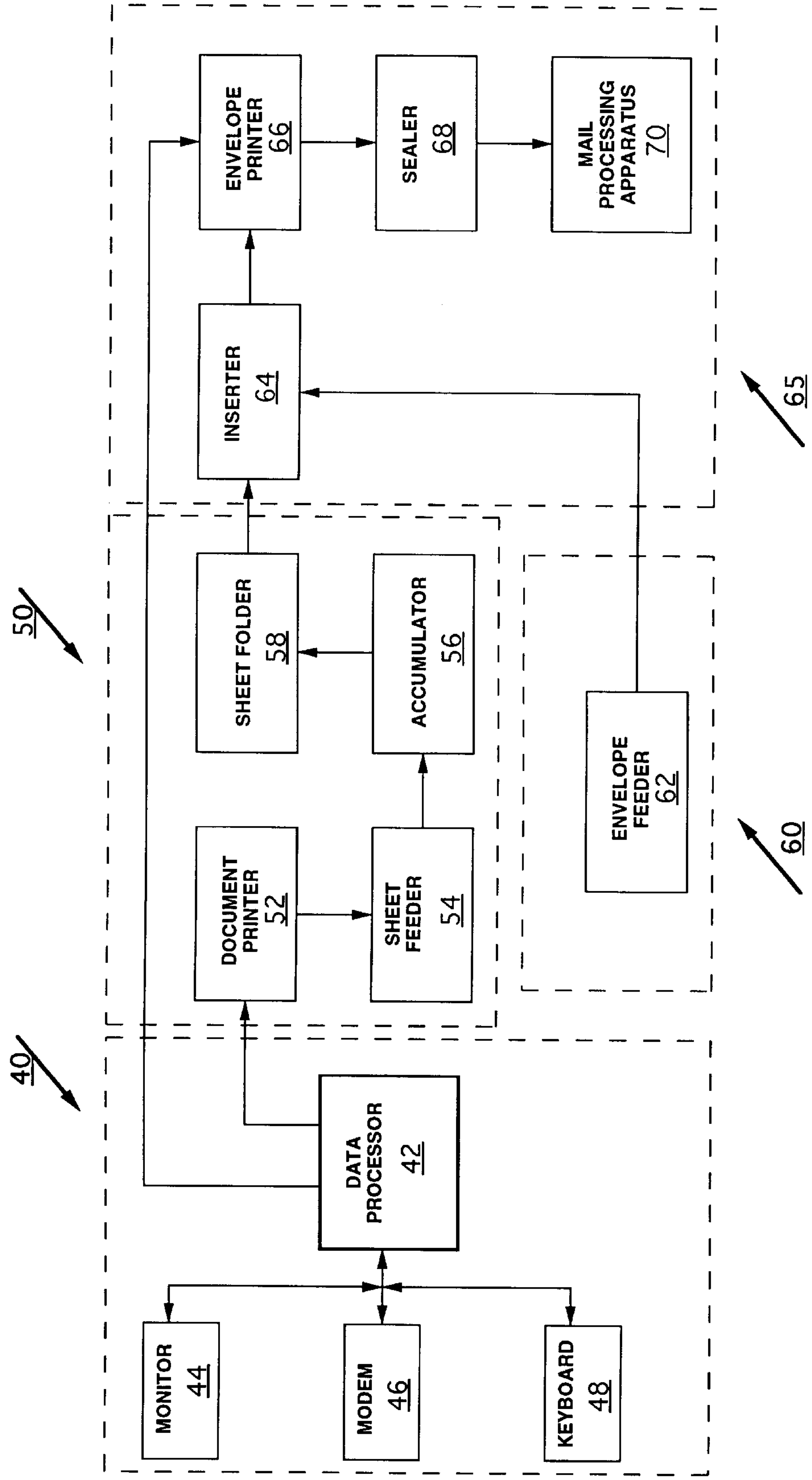
FIG. 1B is a block diagram of the apparatus that can be used in a matched mail embodiment of the present invention where the envelope printer is in-line with the document printer.

Turning to FIG. 1B, there are shown in block form, four subsystems (40, 50, 60 and 65) that together form a system that can be used in an alternative matched mail embodiment of the present invention. As with the embodiment discussed with respect to FIG. 1A, there are two separate data streams emanating from a single data source; however, the data streams are combined at the envelope printer after insertion has taken place.

Subsystem 40 comprises the elements which initiate and control the two data streams. Subsystem 40 is comprised of data processor 42 which stores the programs and applications that initiate addressing data for a first data stream and document data for a second data stream. Data processor 42 is operatively connected to: monitor 44 for viewing of the application's operator interface; modem 46 for accepting data from environments external to the system; and, keyboard 48 for entering data to be used by data processor 42.

Subsystem 50 comprises the elements which support the document data stream. Subsystem 50 is comprised of: document printer 52 which prints document data, obtained from data processor 42, to a substrate such as a standard cut sheet; sheet feeder 54 which directs the printed substrate or sheet to an accumulator; accumulator 56 which collects the individual sheets to be folded together by a sheet folder; and, sheet folder 58 which folds together the individual sheets to be inserted in each envelope.

Subsystem 60 comprises the element which feeds the envelopes to an inserter. Subsystem 60 is comprised of envelope feeder 62 which feeds envelopes to an inserter where the sheets folded by sheet folder 58 are to be inserted into the envelopes.

Subsystem 65, which comprises mailpiece processing apparatus, reunites the divided data streams when the system prints an address upon envelopes coming from an inserter that has placed the folded sheets coming from sheet folder 58 into the envelopes being fed from envelope feeder 62. The elements of this subsystem include inserter 64 which places the folded sheets coming from sheet folder 58 into the envelopes coming from envelope feeder 62. The stuffed envelopes are fed from inserter 64 to envelope printer 66 where an address is printed upon the envelopes by envelope printer 66; and in so doing, the two separate data streams are reunited. The printed envelopes are sealed by sealer 68 before being finished by mail processing apparatus 70. The mail processing apparatus can be diverse in that the apparatus might include: another inserter (if the sealed envelope was being further inserted into another envelope); a mailing scale; a postage meter; and, tabbing devices among other possible elements. A key element of the overall system is the timing of the two data streams so as to always have available an envelope for a folded document, and an address for a stuffed envelope.

Figure 2A:
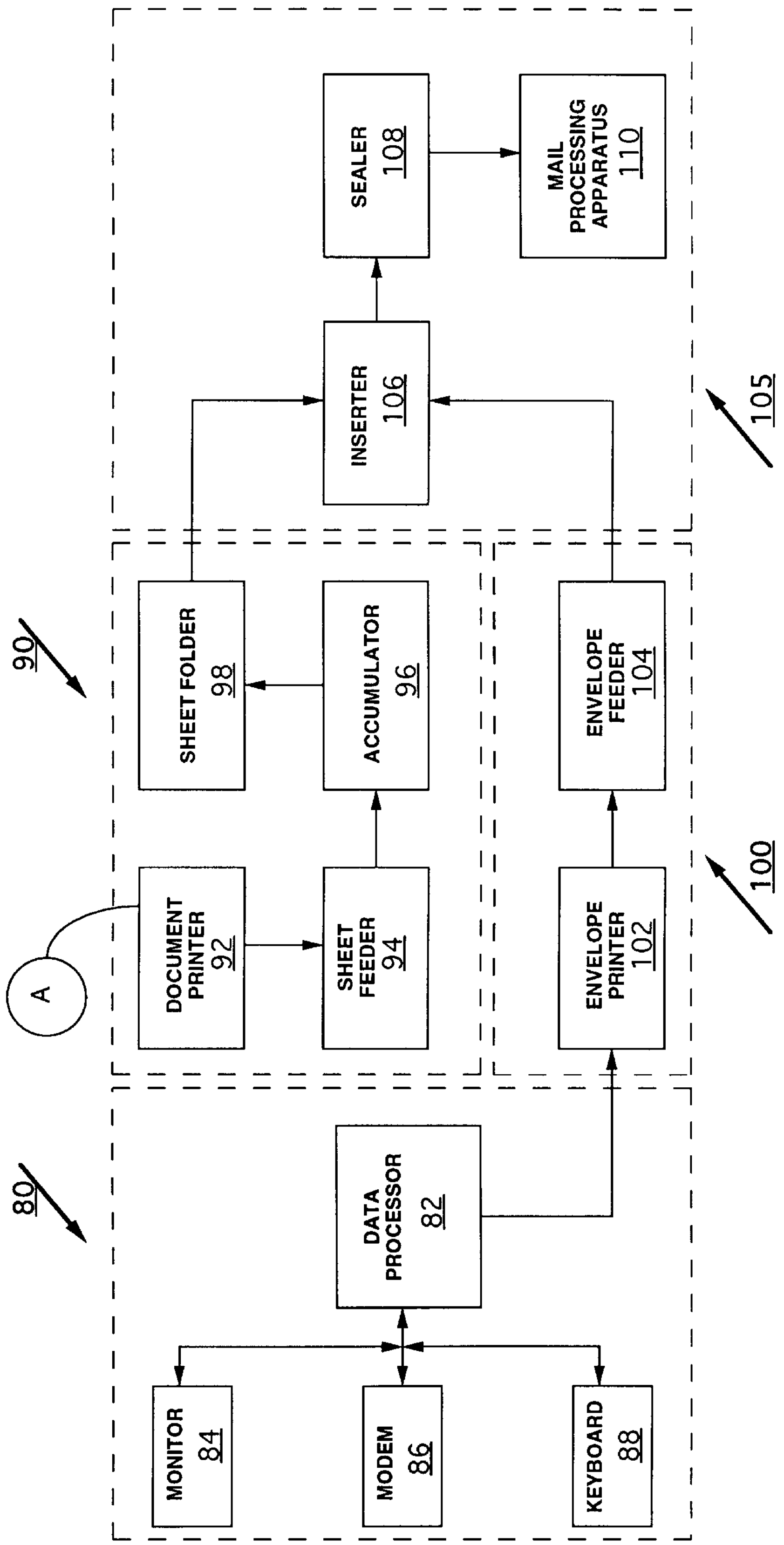
FIG. 2A is a block diagram of the apparatus that can be used in a non-matched mail embodiment of the present invention where the envelope printer is in parallel to the document printer.

Turning to FIG. 2A, there are shown four subsystems (80, 90, 100 and 105) that together form a system that can be used in a non-matched mail embodiment of the present invention. A non-matched mail environment is one in which the document does not have a unique address which corresponds to the address to be printed upon the document's corresponding envelope. In the non-matched mail environment, as with the matched mail environment, there are two separate data streams, each with its own distinct path. The environments differ in that the data streams emanate from two different data sources and eventually unite at some combined operation.

Subsystem 80 comprises the elements which initiate and control the addressing data stream. Subsystem 80 is comprised of data processor 82 which stores the programs and applications that initiate addressing data for a first data stream. Data processor 82 is operatively connected to: monitor 84 for viewing of the application's operator interface; modem 86 for accepting or transmitting data from or to environments external to the system; and, keyboard 88 for entering data to be used by data processor 82.

Subsystem 90 comprises the elements which support the document data stream. Subsystem 90 is comprised of: document printer 92 which receives document data from source A which may be external to data processor 82 and can be another data processor, a download from modem 86, or a download from some other document data generating or transmitting means which can direct the document data to document printer 92 which prints the document data to a substrate such as a standard cut sheet; sheet feeder 94 which directs the printed substrate or sheet to an accumulator; accumulator 96 which collects the individual sheets to be folded together by a sheet folder; and, sheet folder 98 which folds together the individual sheets to be inserted into each envelope by an inserter.

Subsystem 100 comprises the elements which support the addressing data stream. Subsystem 100 is comprised of envelope printer 102 which prints addressing data (which may include postal net barcoding and graphics data), obtained from data processor 82, to a substrate such as an envelope; and, envelope feeder 104 which directs the printed envelope to an inserter.

Subsystem 105, which comprises mail processing apparatus, reunites the divided data streams by inserting the folded sheets into their corresponding addressed envelopes. The elements of this subsystem can be diverse in that they might include: an inserter (though manual insertion could be utilized here); a mailing scale; a postage meter; and, tabbing devices among other possible elements. Again, a key element of the overall system is the timing of the two data streams so as to properly combine a printed document with an addressed envelope.

Figure 2B:
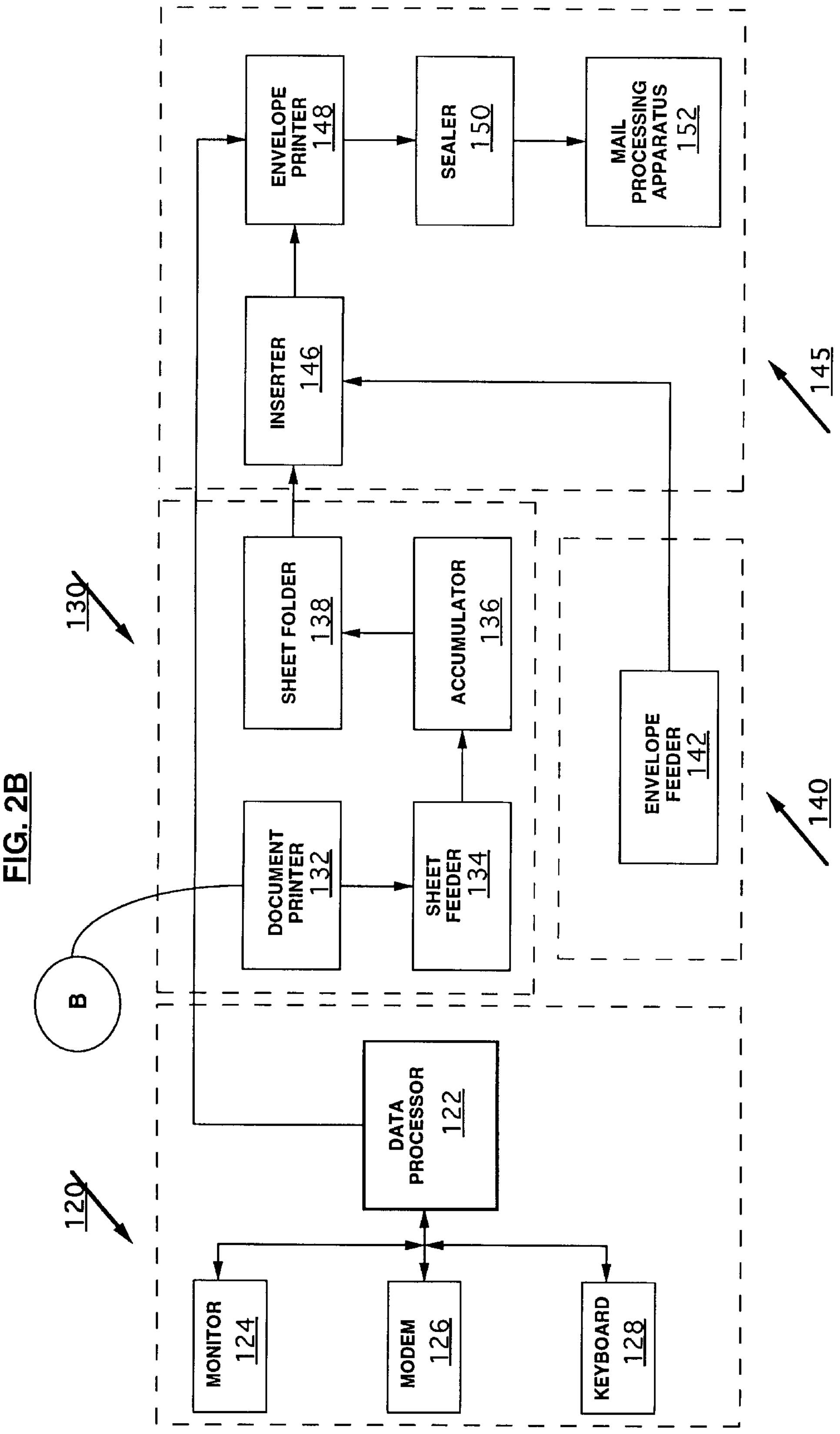
FIG. 2B is a block diagram of the apparatus that can be used in a non-matched mail embodiment of the present invention where the envelope printer is in-line with the document printer.

Turning to FIG. 2B, there are shown four subsystems (120, 130, 140 and 145) that together form a system that can be used in a non-matched mail embodiment of the present invention. A non-matched mail environment is one in which the document does not have a unique address which corresponds to the address to be printed upon the document's corresponding envelope. In the non-matched mail environment, as with the matched mail environment, there are two separate data streams, each with its own distinct path. The environments differ in that the data streams emanate from two different data sources and eventually unite at some combined operation.

Subsystem 120 comprises the elements which initiate and control the addressing data stream. Subsystem 120 is comprised of data processor 122 which stores the programs and applications that initiate addressing data for a first data stream. Data processor 122 is operatively connected to: monitor 124 for viewing of the application's operator interface; modem 126 for accepting or transmitting data from or to environments external to the system; and, keyboard 128 for entering data to be used by data processor 122.

Subsystem 130 comprises the elements which support the document data stream. Subsystem 130 is comprised of: document printer 132 which receives document data from source B which may be external to data processor 122 and can be another data processor, a download from modem 126, or a download from some other document data generating or transmitting means which can direct the document data to document printer 132 which prints the document data to a substrate such as a standard cut sheet; sheet feeder 134 which directs the printed substrate or sheet to an accumulator; accumulator 136 which collects the individual sheets to be folded together by a sheet folder; and, sheet folder 138 which folds together the individual sheets to be inserted in each envelope.

Subsystem 140 comprises the element which feeds the envelopes to an inserter. Subsystem 140 is comprised of envelope feeder 142 which feeds envelopes to an inserter where the sheets folded by sheet folder 138 are to be inserted into the envelopes.

Subsystem 145, which comprises mailpiece processing apparatus, reunites the divided data streams when the system prints an address upon envelopes coming from an inserter that has placed the folded sheets coming from sheet folder 138 into the envelopes being fed from envelope feeder 142. The elements of this subsystem include inserter 146 which places the folded sheets coming from sheet folder 138 into the envelopes coming from envelope feeder 142. The stuffed envelopes are fed from inserter 146 to envelope printer 148 where an address is printed upon the envelopes by envelope printer 148; and in so doing, the two separate data streams are reunited. The printed envelopes are sealed by sealer 150 before being finished by mail processing apparatus 152. The mail processing apparatus can be diverse in that the apparatus might include: another inserter (if the sealed envelope was being further inserted into another envelope); a mailing scale; a postage meter; and, tabbing devices among other possible elements. A key element of the overall system is the timing of the two data streams so as to always have available an envelope for a folded document, and an address for a stuffed envelope.

Figure 3A:
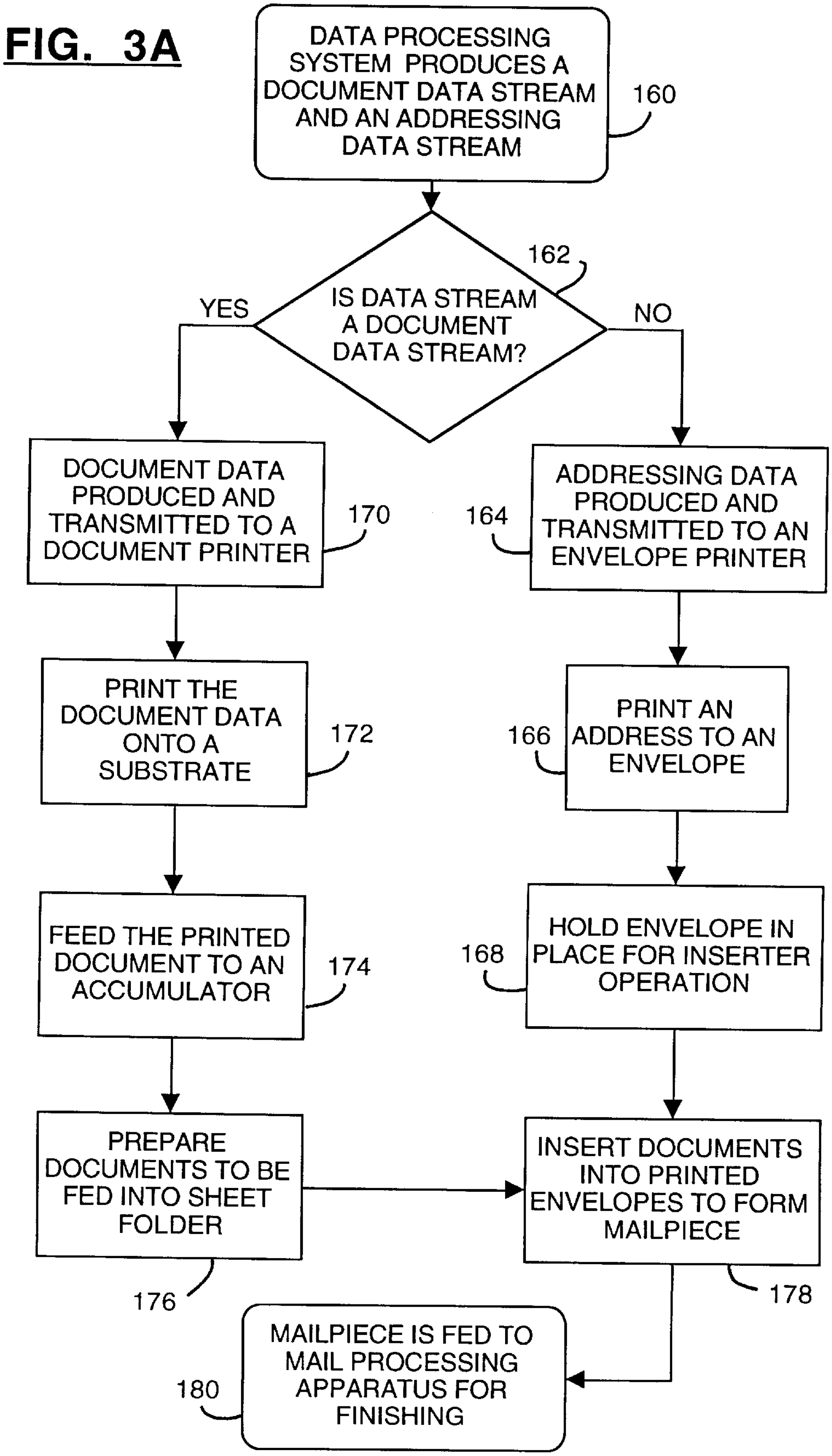
FIG. 3A is a flowchart of the method embodied in a matched mail environment.

Turning to FIG. 3A, there is shown a flowchart of the method of in-line addressing for a matched mail environment. The method begins at step 160 where a data processing system produces a document data stream and an addressing data stream. The data processing system may be dedicated to a mailing system or may contain a variety of application programs and their respective data bases and external environment interfaces. From step 160, the method advances to a query at step 162.

At step 162, the method queries as to whether or not the data stream produced is a document data stream. If the response to the query is "YES," then the method follows the document data stream by advancing to step 170; otherwise, if the response to the query at step 162 is "NO," then the method advances along the addressing data stream to step 164.

At step 164, the addressing data is transmitted to an envelope printer before the method then advances to step 166. The address data is printed to one or more envelopes at step 166. The address data may include: an address with zip code, zip+4, or delivery point coding; a Postnet bar code; return address data; and, graphics data. The address data printed to the envelope will be the same address data contained within the address field of the document data to be printed at step 172. From step 166, the method advances to step 168.

At step 168, the method holds the printed upon envelope in place for a subsequent inserter operation to be performed at step 178.

Returning to step 170, the document data is transmitted to a document printer before the method then advances to step 172. The document data is printed to one or more cut sheets or similar substrate type (hereinafter referred to as "cut sheets") at step 172. Any address data printed to the cut sheet in the address field will be the same address data contained within the address data to be printed at step 166. From step 172, the method advances to step 174 where each printed upon cut sheet is fed to an accumulator which holds the printed upon cut sheets for subsequent feeding to a sheet folder at step 176. Once the printed upon cut sheets are folded at step 176, the method advances to step 178.

At step 178, the folded sheets are inserted into the printed upon envelopes thus combining the two data streams into a single mailpiece. From step 178, the method advances to step 180 where the mailpiece is fed to mail processing apparatus for finishing. A key element of the overall system is the timing of the two data streams so as to properly match the printed document with its respective printed envelope for insertion at this step.

Figure 3B:
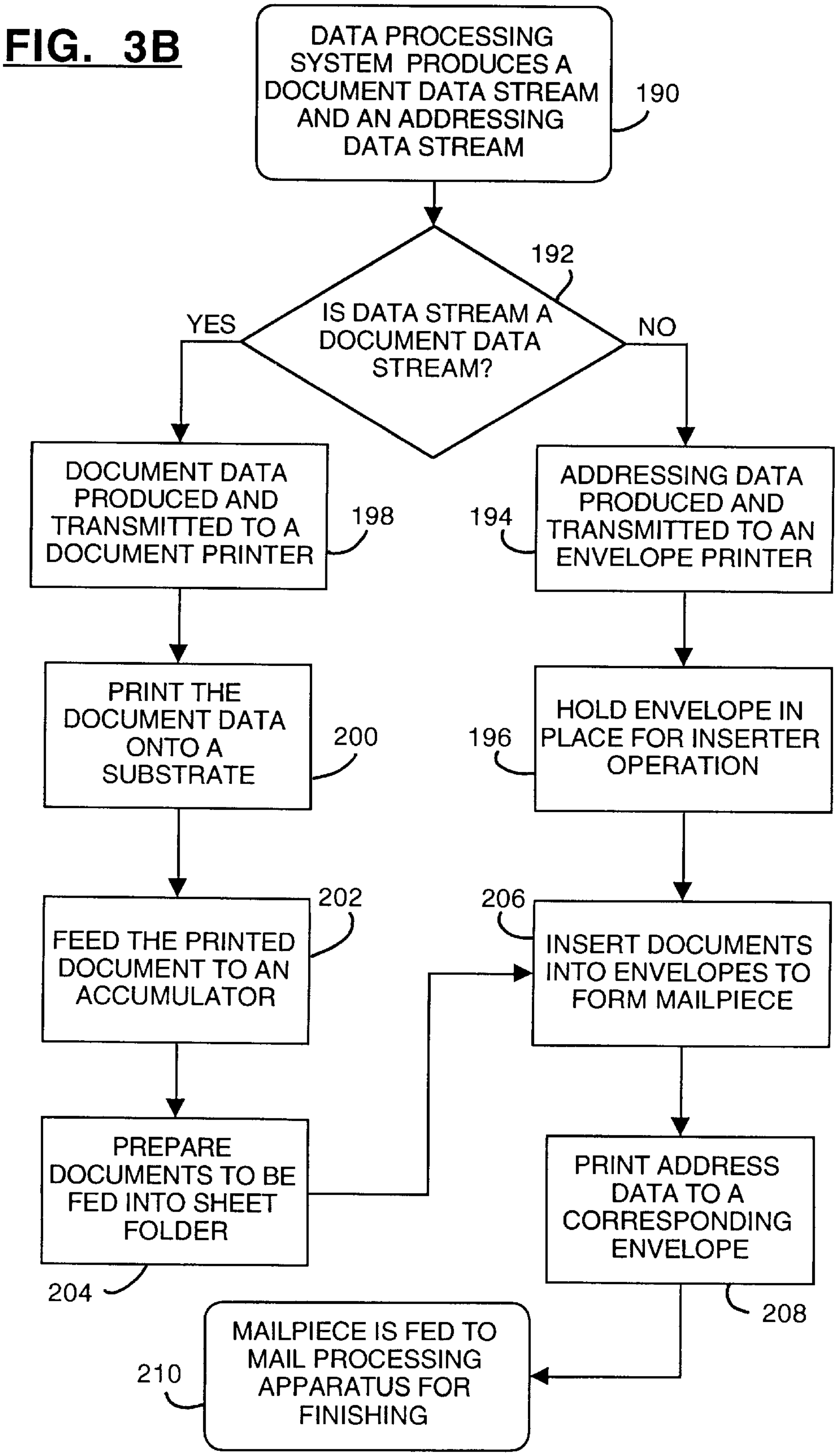
FIG. 3B is a flowchart of an alternative embodiment of the method of the subject invention in a matched mail environment.

Turning to FIG. 3B, there is shown a flowchart of an alternative embodiment of the subject invention for a matched mail environment wherein the envelope printer prints to the envelope after the printed cut sheets have been inserted into the envelope. The method begins with step 190 where a data processing system produces a document data stream and an addressing data stream. The data processing system may be dedicated to a mailing system or may contain a variety of application programs and their respective data bases and external environment interfaces. From step 190, the method advances to a query at step 192.

At step 192, the method queries as to whether or not the data stream produced is a document data stream. If the response to the query is "YES," then the method follows the document data stream by advancing to step 198; otherwise, if the response to the query at step 192 is "NO," then the method advances along the addressing data stream to step 194.

At step 194, the addressing data is transmitted to an envelope printer where the data is stored until step 208. From step 194, the method then advances to step 196. At step 196, the method holds an envelope in place for a subsequent inserter operation to be performed at step 206.

Returning to step 198, the document data is transmitted to a document printer before the method then advances to step 200. The document data is printed to one or more cut sheets or similar substrate type (hereinafter referred to as "cut sheets") at step 200. Any address data printed to the cut sheet in the address field will be the same address data contained within the address data to be printed at step 208. From step 200, the method advances to step 202 where each printed upon cut sheet is fed to an accumulator which holds the printed upon cut sheets for subsequent feeding to a sheet folder at step 204. Once the printed upon cut sheets are folded at step 204, the method advances to step 206.

At step 206, the folded sheets are inserted into the envelopes previously held in place at step 196. From step 206, the method advances to step 208 where the address data is printed to one or more envelopes, thus combining the two data streams into one mailpiece. The address data may include: an address with zip code, zip+4, or delivery point zip coding; a postal net bar code; return address data; and, graphics data. The address data printed to the envelope will be the same address data contained within the address field of the document data to be printed at step 200. From step 208, the method advances to step 210 where the mailpiece is fed to mail processing apparatus for finishing. A key element of the overall system is the timing of the two data streams so as to properly match the printed document with its respective printed envelope for insertion at this step.

Figure 4:
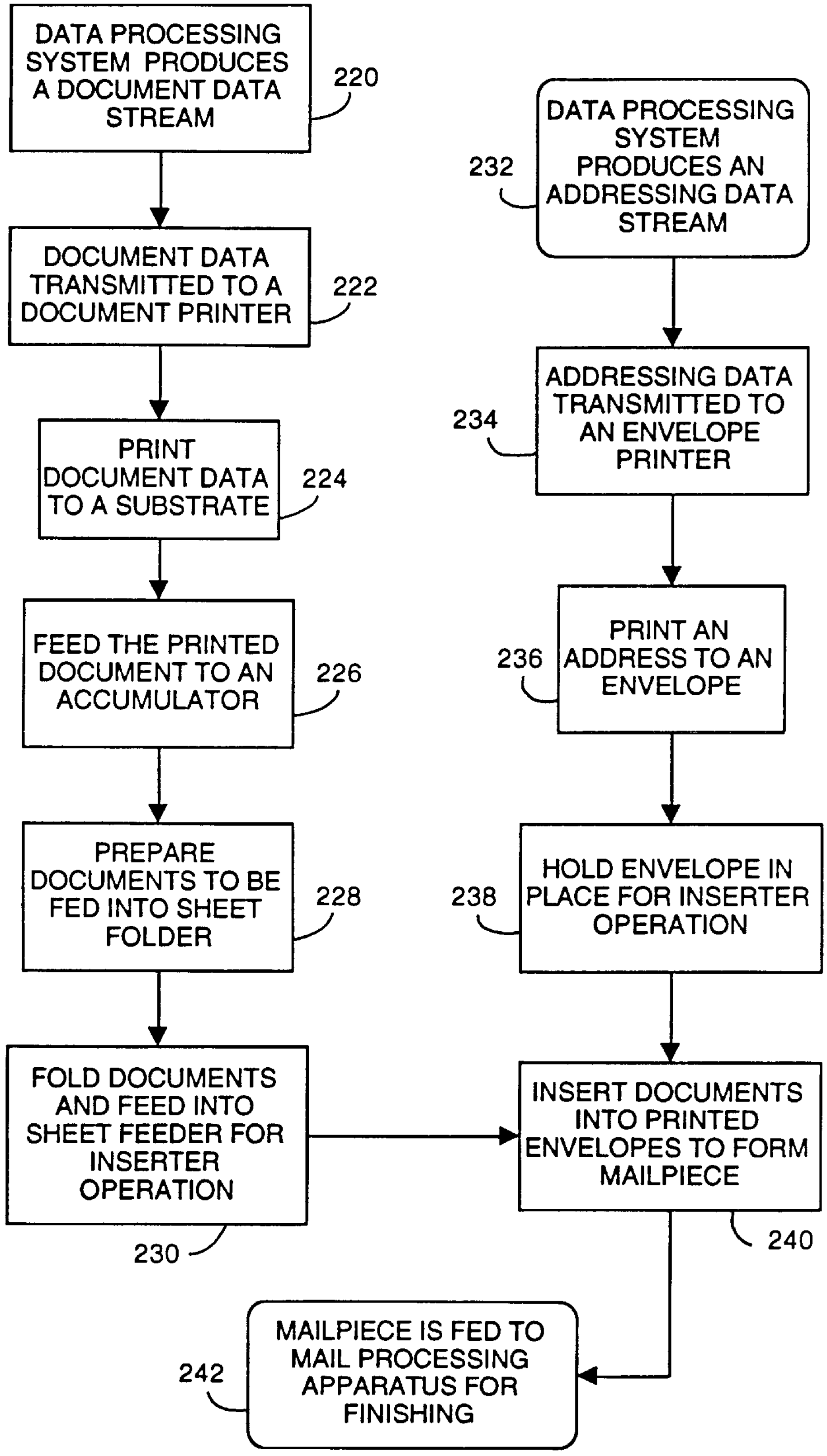
FIG. 4 is a flowchart of the method embodied in a non-matched mail environment.

Turning to FIG. 4, there is shown a flowchart of the method of in-line addressing for a non-matched mail environment. The method begins with steps 200 and 232 which may begin essentially simultaneously or may begin at different times.

At step 220, document data is produced at a data processing system. The system may be dedicated to a mailing system or may contain a variety of application programs and their respective data bases and external environment interfaces. Once the data stream is produced, the document data is transmitted at step 222 to a document printer before the method then advances to step 224. The document data is printed to one or more cut sheets or similar substrate type (hereinafter referred to as "cut sheets") at step 224. From step 224, the method advances to step 226 where each printed cut sheet is fed to an accumulator which holds the printed cut sheets for subsequent feeding, at step 228, to a sheet folder for folding at step 230. Once the printed cut sheets are folded at step 230, the method advances to step 240.

Returning to step 232, addressing data is produced at a data processing system. The system may be dedicated to a mailing system or may contain a variety of application programs and their respective data bases and external environment interfaces. Once produced, the addressing data is transmitted, at step 234, to an envelope printer before the method then advances to step 236. At step 236, the address data is printed to one or more envelopes or similar substrate. The address data may include: an address with zip code, zip+4, or delivery point coding; a Postnet bar code; return address data; and, graphics data. From step 236, the method advances to step 238. At step 238, the method holds the printed envelope in place for a subsequent inserter operation to be performed at step 240.

At step 240, the folded sheets are inserted into the printed envelopes, thus combining the two data streams to form a single mailpiece. From step 240, the method advances to step 242 where the mailpiece is fed to mail processing apparatus for finishing. A key element of the overall system is the timing of the two data streams so as to properly combine the printed document with its respective printed envelope for insertion at this step.

Figure 5:
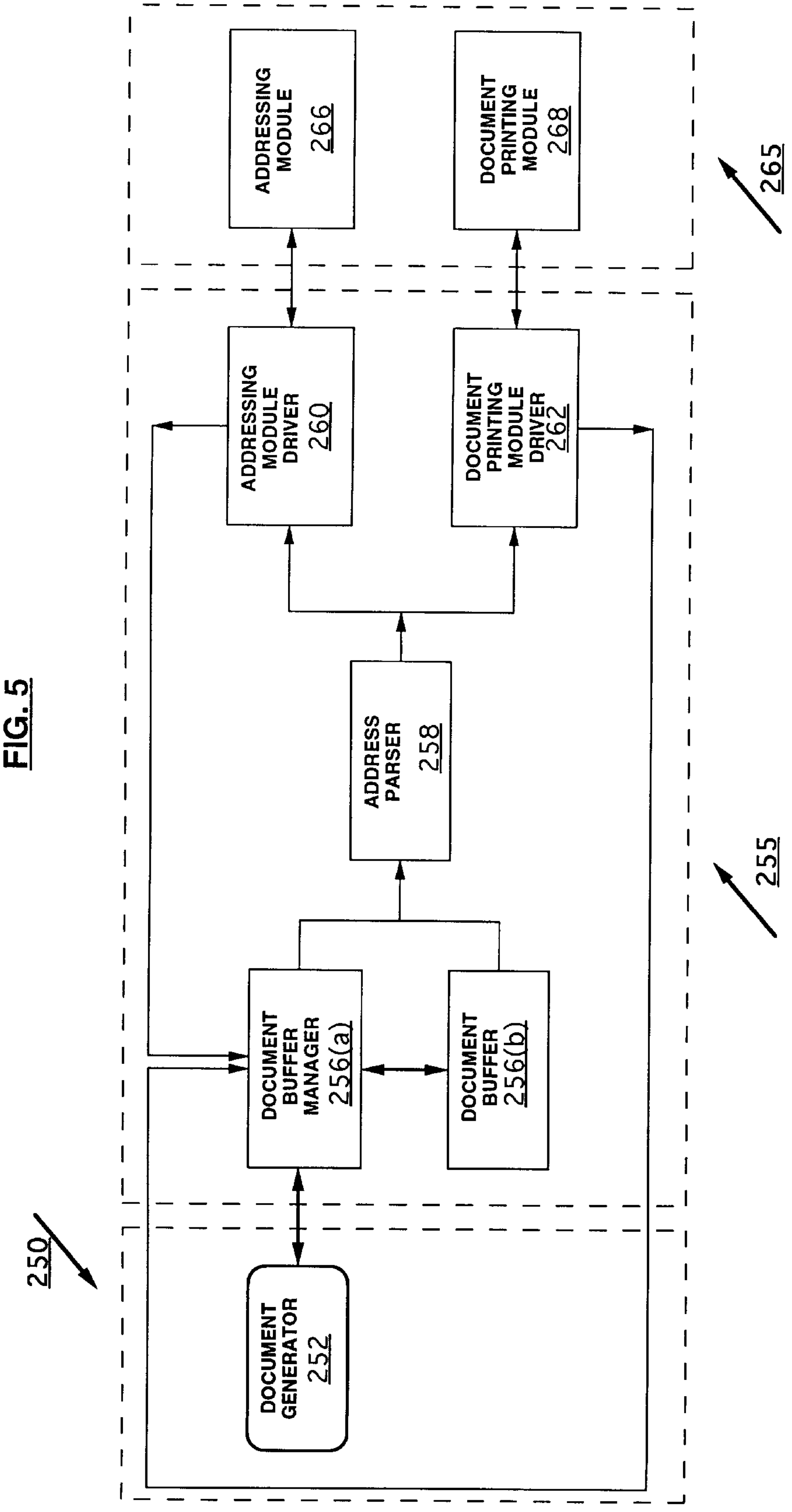
FIG. 5 is a high level flowchart of the print manager program utilized in both the matched mail and non-matched mail embodiments of the method.

Turning to FIG. 5, there is shown a relational flowchart of the invention method consisting of three subsystems (250, 255, and 265) that together form a matched mail embodiment of the present invention.

Subsystem 250 is comprised of document generator 252 which is generally the host application that produces the document data. Subsystem 250 interfaces with subsystem 255.

Subsystem 255 is comprised of: document buffer manager 256(*a*) and its corresponding document buffer 256(*b*); address parser 258; addressing module driver 260; and, document printing module driver 262. Document buffer manager 256(*a*) is responsible for managing the document data and address data flows from document generator 252 through to the printing of that data on to either an envelope or to a cut sheet. The document being worked upon by the system is stored in document buffer 256(*b*) which is under the control of document buffer manager 256(*a*). From document buffer 256(*b*), the document data is transmitted to address parser 258 which will then begin to perform address and zip code parsing based upon the combined data received; thereby, the address data can be separated out from document or graphics data. The address is then scanned for a postal zip code.

The elements of a postal zip code consist of four parts; these are: (i) the "zip code," which consists of 5 digits and refers to geographic area or zone; (ii) the "zip plus 4" further breaks down a zip code region into smaller sub-regions, this consists of four digits added to the base zip code; (iii) "delivery point digits" which consist of two additional digits that further break down a zip plus 4 so that the United States Postal Service (U.S.P.S.) can more accurately pin point an exact location; and, (iv) a check sum digit. The delivery point digits are abstracted from the street line of the address using a U.S.P.S. approved algorithm.

When the delivery point digits have been added to the zip code, addressing module driver 260 will direct that a bar code be determined that corresponds to the newly created zip code. The determination of the bar code is subject to a series of rules resident in the print memory; these rules correspond to bar code type and translate the human readable zip code to the machine readable bar code. The bar code a address data will then be positioned by addressing module driver 260 for printing to a selected substrate.

In addition to document data, document generator 252 can pass printer commands that will be utilized by addressing module driver 260 and document printing module 262. The printer command data, print data, and additional commands if any, are downloaded to addressing module driver 260 and to document printing module driver 262. The two drivers will prepare their respective printers to receive the combined data. Additionally, if there is a jam within the feed path of printing mechanisms 266 and 268, the jam information will be relayed to printer drivers 260 and 262 which in turn will transmit the jam information to document buffer manager 256(*a*) so that the buffer manager can stop the flow of document data and restart or restore the document data stream.

Subsystem 265 comprises the printers that will print the separate document and address data streams. In subsystem 265, the bar code, address data, and graphics data if any, are printed on the envelope by addressing module 266 and the document data is printed on its respective cut sheets by document printing module 268.

As can be appreciated by those skilled in the art, a number of variations of the subject invention are possible. These variations include, but are not limited to: the elements forming the mail apparatus used for finishing of the mailpiece; the decision to use matched mail as opposed to non-matched mail; the capabilities of the printers with respect to the assignment of bar codes to address data; the nature of the document generator; and, the arrangement of jam sensors within the feed path of the envelopes or cut sheets.

What is claimed is:

1. A method of in-line addressing comprising the steps of:

(a) generating document data in a data processing system and transmitting said document data to a document printer;

(b) generating, essentially simultaneously with said generation of said document data, address data in said data processing system and transmitting said address data to an envelope printer;

(c) printing said document data, at said document printer, onto a substrate and feeding said printed substrate to an accumulator;

(d) printing, at said envelope printer, said address data upon one or more envelopes;

(e) preparing at said accumulator, predetermined batches of one or more sheets of said printed substrate for feeding into a sheet folder;

(f) folding said predetermined batches in said sheet folder and then feeding said folded batches to said inserter; and, wherein further said sheet feeder, said accumulator, said sheet folder, and said inserter comprise a folder/inserter system;

(g) timing envelope throughput of said envelope printer to match batch throughput of said predetermined batch in said folder/inserter system;

(h) inserting said folded batches into one or more envelopes to form a stuffed envelope;

(i) sealing each of said stuffed envelopes; and (j) transporting said sealed envelope to a mail processing apparatus.

2. The method of claim 1, wherein said envelope printer is placed in-line so that said address data is printed upon said one or more envelopes before feeding said printed envelopes to said inserter.

3. The method of claim 1, wherein said envelope printer is placed in-line so that said address data is printed upon said stuffed envelopes; and said printed envelopes are fed to a sealer wherein said printed envelopes are sealed.

4. The method of claim 1, wherein said envelope printer is capable of printing on an envelope: a return address; a destination address; and, a bar code in respect of said destination address.

5. The method of claim 1, wherein said address data is merged with graphics data so that said envelope printer is capable of printing graphics on said envelope.

6. The method of claim 1, wherein said folder/inserter system times passage of said substrate as said substrate is fed through said folder/inserter system, and if said time exceeds a predetermined threshold, then determining that said substrate is jammed or out of alignment thus causing a feed path error.

7. The method of claim 6, wherein if it is determined that said feed path error has occurred, then said folder/inserter system transmits a first signal to a system operator wherein said first signal is indicative of said feed path error; and, said folder/inserter system transmits a second signal to said data processing system wherein said second signal is indicative of said feed path error and wherein said second signal is an instruction to said data processing system to stop transmitting said document data to said document printer and to stop transmitting said address data to said envelope printer.

8. A method of in-line addressing comprising the steps of:

(a) entering document data into a data processing system and transmitting said document data to a document printer;

(b) generating address data in said data processing system and transmitting said address data to an envelope printer;

(c) printing said document data, at said document printer, onto a substrate and feeding said printed substrate to an accumulator;

(d) printing, at said envelope printer, said address data upon one or more envelopes;

(e) preparing at said accumulator, predetermined batches of one or more sheets of said printed substrate for feeding into a sheet folder;

(f) folding said predetermined batches in said sheet folder and then feeding said folded batches to said inserter;

and, wherein further said sheet feeder, said accumulator, said sheet folder, and said inserter comprise a folder/inserter system;

(g) timing envelope throughput of said envelope printer to match batch throughput of said predetermined batch in said folder/inserter system;

(h) inserting said folded batches into one or more envelopes to form a stuffed envelope;

(i) sealing each of said stuffed envelopes; and (j) transporting said sealed envelope to a mail processing apparatus.

9. The method of claim 8, wherein said envelope printer is placed in-line so that said address data is printed upon said one or more envelopes before feeding said printed envelopes to said inserter.

10. The method of claim 8, wherein said envelope printer is placed in-line so that said address data is printed upon said stuffed envelopes; and said printed envelopes are fed to a sealer wherein said printed envelopes are sealed.

11. The method of claim 8, wherein said envelope printer is capable of printing on an envelope: a return address; a destination address; and, a bar code in respect of said destination address; and, wherein said address data can be merged with graphics data so that said envelope printer is capable of printing graphics on said envelope.

12. The method of claim 11, wherein said folder/inserter system times passage of said substrate as said substrate is fed through said folder/inserter system, and if said time exceeds a predetermined threshold, then determining that said substrate is jammed or out of alignment thus causing a feed path error.

13. The method of claim 12, wherein if it is determined that said feed path error has occurred, then said folder/inserter system transmits a first signal to a system operator wherein said first signal is indicative of said feed path error; and, said folder/inserter system transmits a second signal to said data processing system wherein said second signal is indicative of said feed path error and wherein said second signal is an instruction to said data processing system to stop transmitting said document data to said document printer and to stop transmitting said address data to said envelope printer.

14. The method of claim 8, wherein said envelope printer utilizes RAM memory and wherein said graphics data is downloaded into said RAM memory prior to receipt of said address data.

* * * * *